US010869289B2

(12) United States Patent
Tang

(10) Patent No.: US 10,869,289 B2
(45) Date of Patent: Dec. 15, 2020

(54) METHOD FOR DEVICE TO DEVICE COMMUNICATION, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/326,052

(22) PCT Filed: Aug. 16, 2016

(86) PCT No.: PCT/CN2016/095484
§ 371 (c)(1),
(2) Date: Feb. 15, 2019

(87) PCT Pub. No.: WO2018/032338
PCT Pub. Date: Feb. 22, 2018

(65) Prior Publication Data
US 2019/0191404 A1   Jun. 20, 2019

(51) Int. Cl.
*H04W 76/14* (2018.01)
*H04W 72/12* (2009.01)
(Continued)

(52) U.S. Cl.
CPC ....... *H04W 56/0045* (2013.01); *H04W 48/16* (2013.01); *H04W 56/00* (2013.01);
(Continued)

(58) Field of Classification Search
CPC .............. H04W 72/0406; H04W 72/1273
See application file for complete search history.

(56) References Cited

U.S. PATENT DOCUMENTS 10,440,628 B2 * 10/2019 Huang ............. H04W 36/0077
2013/0083779 A1     4/2013 Ahn et al.
(Continued)

FOREIGN PATENT DOCUMENTS

CN   103428818   12/2013
CN   103582077   2/2014
(Continued)

OTHER PUBLICATIONS

WIPO, ISR for PCT/CN2016/095484, May 12, 2017.
(Continued)

*Primary Examiner* — Raj Jain
(74) *Attorney, Agent, or Firm* — Hodgson Russ LLP

(57) ABSTRACT

Embodiments of the present disclosure provide a method for device-to-device (D2D) communication and a terminal device. The method includes: determining first access information by a first terminal device, the first access information being used to access a first cell; and sending the first access information by the first terminal device, causing a second terminal device to determine, based on the first access information as received, second access information used by the second terminal device to access a second cell. Thus, different terminal devices obtain access information used for accessing a cell by way of D2D communication, which can reduce delay generated by obtaining the access information from a network device by a terminal device.

16 Claims, 5 Drawing Sheets

(51) Int. Cl.
*H04W 72/04* (2009.01)
*H04W 56/00* (2009.01)
*H04W 48/16* (2009.01)
*H04W 88/04* (2009.01)
*H04W 92/18* (2009.01)

(52) U.S. Cl.
CPC ... *H04W 56/0015* (2013.01); *H04W 72/0406* (2013.01); *H04W 72/12* (2013.01); *H04W 76/14* (2018.02); *H04W 88/04* (2013.01); *H04W 92/18* (2013.01)

(56) References Cited

U.S. PATENT DOCUMENTS

| | | | | |
|---|---|---|---|---|
| 2014/0177449 | A1* | 6/2014 | Novak | H04W 4/80 370/241 |
| 2015/0009985 | A1* | 1/2015 | Kwon | H04W 74/0833 370/350 |
| 2015/0146687 | A1 | 5/2015 | Kim et al. | |
| 2015/0181546 | A1* | 6/2015 | Freda | H04L 27/0014 370/336 |
| 2015/0373660 | A1* | 12/2015 | Gunnarsson | H04L 5/0069 370/350 |
| 2017/0156156 | A1* | 6/2017 | Van Phan | H04W 72/0406 |
| 2018/0270696 | A1* | 9/2018 | Duan | H04W 48/02 |
| 2019/0116578 | A1* | 4/2019 | Tang | H04W 4/06 |

FOREIGN PATENT DOCUMENTS

| | | |
|---|---|---|
| CN | 103702408 | 4/2014 |
| CN | 104380644 | 2/2015 |
| CN | 104737592 | 6/2015 |
| CN | 105144791 | 12/2015 |
| EP | 2903358 | 8/2015 |
| WO | 2014050887 | 4/2014 |
| WO | 2015072713 | 5/2015 |

OTHER PUBLICATIONS

EPO, Office Action for EP Application No. 16913099.4, dated Jun. 24, 2019.
JPO, Office Action for JP Application No. 2019-508852, dated Jan. 24, 2020.
IPI, Office Action for IN Application No. 201917010006, dated Aug. 18, 2020.
ZTE, "Synchronization for D2D Discovery," 3GPP TSG RAN WG1 Meeting #76bis, R1-141432, Mar. 2014, 4 pages.
CNIPA, First Office Action for CN Application No. 201680088484.7, dated Oct. 29, 2020.

* cited by examiner

METHOD FOR DEVICE TO DEVICE COMMUNICATION, AND TERMINAL DEVICE

CROSS-REFERENCE TO RELATED APPLICATION

This application is a National Stage Entry of International Application No. PCT/CN2016/095484, filed Aug. 16, 2016, the entire contents of which is incorporated herein by reference.

TECHNICAL FIELD

Embodiments of the present disclosure relate to the field of wireless communication, and more particularly, to a method for device-to-device (D2D) communication and a terminal device.

BACKGROUND

In the process of accessing an existing terminal device to a system, it is required to obtain access information used to access the system. For example, the terminal device needs to obtain system information from a broadcast message of a network device so as to obtain basic information (such as carrier bandwidth, etc.) of a cellular system where the network device is. However, the system may broadcast the system information only in a fixed cycle, and thus a certain delay may be generated when the terminal obtains the system information. For another example, when the terminal device is formally accessed to the system, it is also required to obtain a timing advance (TA), which may represent a distance between the terminal device and the network device. The terminal transmits a signal ahead of the TA value. Thus, it may be avoided the case that different terminal devices reach a base station at different time due to a transmission delay. The terminal device needs to send a known sequence to the network device to obtain the TA value. After calculating the TA value out based on this known sequence, the network device informs the terminal of the size of the TA value. Therefore, a certain delay also may be generated in the process when the terminal obtains TA information. Obtained access information such as the system information and the TA value used to access a cell system jointly constitute a portion of delay when the terminal is initially accessed to the system.

SUMMARY

Embodiments of the present disclosure provide a method for device-to-device (D2D) communication and a terminal device, which can reduce delay generated by obtaining access information for accessing a system from a network device by a terminal device.

According to a first aspect, there is provided a method for device-to-device (D2D) communication, which includes: determining first access information by a first terminal device, the first access information being used to access a first cell; and sending the first access information by the first terminal device, causing a second terminal device to determine, based on the first access information as received, second access information used by the second terminal device to access a second cell.

In an embodiment, the first access information includes first system information used to access the first cell, and the second access information includes second system information used by the second terminal device to access the second cell; and/or In an embodiment, the first access information includes a first timing advance (TA) used by the first terminal device to access the first cell, and the second access information includes a second TA used by the second terminal device to access the second cell.

As another embodiment, the method further includes: sending condition information by the first terminal device, the condition information being used for indicating the second terminal device to determine the second access information based on the first access information when a condition indicated by the condition information is satisfied.

As another embodiment, the condition information includes at least one piece of following information: location condition information, time condition information, speed condition information, and information of a cell ID of the first cell.

As another embodiment, the time condition information includes a moment when the first terminal device receives the first access information from other devices and an effective duration of the first access information.

In an embodiment, the effective duration may represent a time range from receiving the first access information by the first terminal device to receiving the first access information by the second terminal device, or the effective duration also may be an end moment of the first access information, which is not limited in the present disclosure.

As another embodiment, the first access information includes a first TA, and the location condition information includes a location of the first terminal device when the first terminal device receives the first TA from other devices and an effective use distance of the first TA.

As another embodiment, the determining first access information by a first terminal device includes: determining the first access information by the first terminal device based on a movement speed of the first terminal device.

As another embodiment, the sending the first access information by the first terminal device includes: sending the first system information and the first TA and the movement speed of the first terminal device if the movement speed of the first terminal device is less than or equal to a speed threshold; or sending the first system information and the movement speed of the first terminal device if the movement speed of the first terminal device is greater than the speed threshold.

As another embodiment, before sending the first access information by the first terminal device, the method further includes: receiving, by the first terminal device, indication information sent from a network side device, the indication information being used for indicating the first terminal device to send the access information; and the sending the first access information by the first terminal device includes: sending the first access information by the first terminal device based on the indication information.

As another embodiment, the sending the first access information by the first terminal device includes: sending a plurality pieces of first access information by the first terminal device, causing the second terminal device to determine, based on the plurality pieces of first access information as received, the second access information used by the second terminal device to access the second cell, wherein the plurality pieces of first access information correspond to a plurality of first cells one to one, and each piece of first access information among the plurality pieces of first access information is used to access a corresponding first cell.

Optionally, the first terminal device also may send cell IDs of a plurality of cells respectively corresponding to a plurality pieces of first access information and TA values respectively used to access these cells, etc.

Optionally, if the first access information includes first system information, a plurality pieces of first system information in a plurality pieces of first access information may likely have a portion of identical information and a portion of different information. At this moment, in the case that the first terminal device sends the first system information of the currently-accessed first cell, the first terminal device also may send that portion of different information in other first system information, and also may indicate which portion of the other first system information is the same as or different from the first system information of the currently-accessed first cell.

Optionally, the first terminal device also may send time difference information when sending the plurality pieces of first access information, wherein the time difference information is a differential between moments of obtaining signals from different cells by the first terminal device.

For example, the time difference may be a time difference between primary synchronization signals (PSS) of different cells detected by the first terminal device, or may be a time difference between secondary synchronization signals (SSS).

As another embodiment, the sending the first access information by the first terminal device includes: broadcasting the first access information by the first terminal device.

According to a second aspect, there is provided a terminal device, which may be configured to perform various procedures performed by the first terminal device in the method for D2D communication according to the above first aspect and various implementation manners thereof. The terminal device includes a determining module and a sending module. The determining module is configured to determine first access information, wherein the first access information is used to access a first cell. The sending module is configured to send the first access information determined by the processor, causing a second terminal device to determine, based on the first access information as received, second access information used by the second terminal device to access a second cell.

According to a third aspect, there is provided a terminal device, which may be configured to perform various procedures performed by the first terminal device in the method for D2D communication according to the above first aspect and various implementation manners thereof. The terminal device includes a processor and a transreceiver. The processor is configured to determine first access information, wherein the first access information is used to access a first cell. The transreceiver is configured to send the first access information determined by the determining module, causing a second terminal device to determine, based on the first access information as received, second access information used by the second terminal device to access a second cell.

According to a fourth aspect, there is provided a method for device-to-device (D2D) communication. The method includes: receiving, by a second terminal device, first access information sent from a first terminal device, the first access information being access information used when the first terminal device accesses a first cell; and determining, by the second terminal device based on the first access information, second access information used by the second terminal device to access a second cell.

As another embodiment, the first access information includes first system information used to access the first cell, and the second access information includes second system information used by the second terminal device to access the second cell; and/or the first access information includes a first timing advance (TA) used by the first terminal device to access the first cell, and the second access information includes a second TA used by the second terminal device to access the second cell.

As another embodiment, before determining, by the second terminal device based on the first access information, second access information used to access the second cell, the method further includes: receiving condition information by the second terminal device; and In an embodiment, the determining, by the second terminal device based on the first access information, second access information used by the second terminal device to access a second cell includes: determining the second access information by the second terminal device based on the first access information when a condition indicated by the condition information is satisfied.

As another embodiment, the condition information includes at least one piece of following information: location condition information, time condition information, speed condition information, and information of a cell ID of the first cell.

As another embodiment, the time condition information includes a moment when the first terminal device receives the first access information from other devices and an effective duration of the first access information.

In an embodiment, the effective duration may represent a time range from receiving the first access information by the first terminal device to receiving the first access information by the second terminal device, or the effective duration also may be an end moment of the first access information, which is not limited in the present disclosure.

As another embodiment, the first access information includes a first TA, and the location condition information includes a location of the first terminal device when the first terminal device receives the first TA from other devices and an effective use distance of the first TA.

In an embodiment, the effective use distance may represent a maximum distance between the second terminal device and the first terminal device; and the effective use distance also may directly indicate at least one of a longitude coordinate range, a latitude coordinate range and a height coordinate range of the terminal device that can use the first TA, which is not limited in the present disclosure.

As another embodiment, the condition information includes a cell ID of the first cell; and the determining, by the second terminal device based on the first access information, the second access information used by the second terminal device to access the second cell includes: if a cell ID of the second cell to be accessed for the second terminal device is the same as the cell ID of the first cell, determining, by the second terminal device based on the first access information, the second access information used to access the second cell.

As another embodiment, the first access information includes the first TA, the speed condition information includes a movement speed and a speed threshold of the first terminal device, and the determining, by the second terminal device based on the first access information, the second access information used by the second terminal device to access the second cell includes: determining, by the second terminal device based on the first TA, a second TA used to access the second cell if the movement speed of the first terminal device is less than or equal to the speed threshold.

As another embodiment, the receiving condition information by the second terminal device includes: receiving, by the second terminal device, the condition information sent from the first terminal device; or receiving, by the second terminal device, the condition information sent from a network device.

As another embodiment, the receiving, by a second terminal device, first access information sent from a first terminal device includes: receiving, by the second terminal device, the first access information respectively sent from a plurality of first terminal devices.

In an embodiment, the determining, by the second terminal device based on the first access information, second access information used by the second terminal device to access a second cell includes: determining, by the second terminal device, a target terminal device from the plurality of first terminal devices based on speed information or location information of each of the plurality of first terminal devices; and determining, by the second terminal device, the second access information based on the first access information of the target terminal device.

As another embodiment, before determining, by the second terminal device, a target terminal device from the plurality of first terminal devices based on speed information or location information of each of the plurality of first terminal devices, the method further includes: determining, by the second terminal device, that the second terminal device satisfies a condition indicated by the condition information of each of the plurality of first terminal devices.

In an embodiment, the determining, by the second terminal device, a target terminal device from the plurality of first terminal devices based on speed information or location information of each of the plurality of first terminal devices includes: determining from the plurality of first terminal devices, by the second terminal device, a first terminal device having a slowest movement speed as the target terminal device, or determining from the plurality of first terminal devices, by the second terminal device, a first terminal device nearest to the second terminal device as the target terminal device.

As another embodiment, the method further includes: the receiving, by a second terminal device, first access information sent from a first terminal device includes: receiving, by the second terminal device, a plurality pieces of first access information sent from the first terminal device.

In an embodiment, the determining, by the second terminal device based on the first access information, second access information used by the second terminal device to access a second cell includes: determining, by the second terminal device based on the plurality pieces of first access information, the second access information used by the second terminal device to access the second cell.

For example, the second terminal device may detect a signal quality or signal power of the plurality pieces of first access information. Supposing the signal quality (signal power) of the first access information of the currently-accessed first cell of the first terminal device is the best (highest), the second terminal device may determine the second access information based on the first access information.

As another embodiment, the method further includes: sending the second access information by the second terminal device.

As another embodiment, the sending the second access information by the second terminal device includes: broadcasting the second access information by the second terminal device.

According to a fifth aspect, there is provided a terminal device, which may be configured to perform various procedures performed by the second terminal device in the method for D2D communication according to the above second aspect and various implementation manners thereof. The terminal device includes a determining module and a receiving module. The receiving module is configured to receive first access information sent from a first terminal device, wherein the first access information is used to access a first cell. The determining module is configured to determine, based on the first access information determined by the receiving module, second access information used by the second terminal device to access a second cell.

According to a sixth aspect, there is provided a terminal device, which may be configured to perform various procedures performed by the second terminal device in the method for D2D communication according to the above second aspect and various implementation manners thereof. The terminal device includes a processor and a transreceiver. The transreceiver is configured to receive first access information sent from a first terminal device, wherein the first access information is used to access a first cell. The processor is configured to determine, based on the first access information determined by the transreceiver, second access information used by the second terminal device to access a second cell.

According to a seventh aspect, there is provided a computer readable storage medium storing a program, which causes a network device to perform any method for D2D communication according to the first aspect and various implementation manners thereof.

According to an eighth aspect, there is provided a computer readable storage medium storing a program, which causes the terminal device to perform any method for D2D communication according to the second aspect and various implementation manners thereof.

BRIEF DESCRIPTION OF THE DRAWINGS

To describe the technical solutions of the embodiments of the present disclosure more clearly, the accompanying drawings required for describing the embodiments of the present disclosure will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
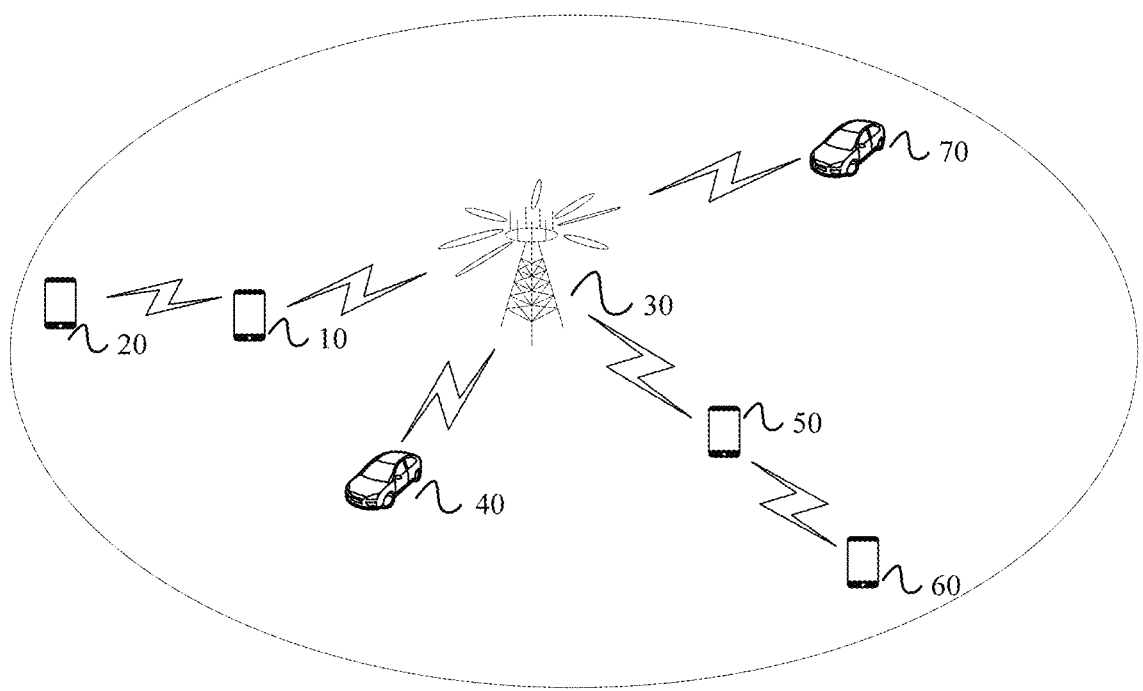
FIG. 1 is a schematic diagram of an application scenario according to an embodiment of the present disclosure.

FIG. 1 is a schematic diagram of a wireless communication system used according to an embodiment of the present disclosure. the wireless communication system may include at least one network device 30. The network device 30 may be a device communicating with a terminal device. Each network device 30 may provide communication coverage for a particular geographic region, and may communicate with a terminal device (such as UE) positioned within the coverage region. The network device 30 may be a Base Transceiver Station (BTS) in a Global System of Mobile (GSM) communication system or a Code Division Multiple Access (CDMA) system, a NodeB (NB) in a Wideband Code Division Multiple Access (WCDMA) system, an evolutional Node B (eNB or eNodeB) in a long term evolution (LTE) system, an LTE Time Division Duplex (TDD) system, a wireless controller in Cloud Radio Access Network (CRAN), or a relay station, an access point, a vehicle-mounted device, a wearable device, a network side device in a future 5G network, or a network device in a future evolutional Public Land Mobile Network (PLMN).

The wireless communication system further includes a plurality of terminal devices (for example, the terminal device 10 to the terminal device 70) positioned within the coverage scope of the network device 30. These terminal devices may be either mobile or fixed. These terminal devices may refer to access terminals, user equipment (UE), subscriber units, subscriber stations, mobile stations, remote stations, remote terminals, mobile devices, user terminals, terminals, wireless communication devices, user agents, or user apparatuses. The access terminal may be a cellular phone, a cordless phone, a SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in the future 5G network, or a terminal device in the future evolutional Public Land Mobile Network (PLMN), etc.

FIG. 1 schematically illustrates one network device and six terminal devices. Optionally, the wireless communication system may include a plurality of network devices, and each network device may include other numbers of terminal devices within its coverage scope, which is not limited in the embodiments of the present disclosure. Moreover, the wireless communication system 10 may further include a mobile management entity (MME), a serving gateway (S-GW), a packet data network gateway (P-GW), and other network entities, but the embodiments of the present disclosure are limited thereto.

Specifically, the terminal device 10 to the terminal device 70 may carry out communications in a cellular communication mode or D2D communication mode. In the cellular communication mode, the terminal device may carry out communications with other terminal devices via a cellular link between the network devices. In the D2D communication mode, two terminal devices may directly carry out communications via a D2D link.

When terminal devices carry out D2D communication (for example, V2V communication or V2X communication), transmission resources may be autonomously selected by the terminal devices, or transmission resources during the D2D communication may be allocated to the network device, which is not limited in the embodiments of the present disclosure.

The D2D communication may refer to vehicle to vehicle (V2V) communication or V2X communication. In the V2X communication, X may broadly refer to a device having wireless reception and transmission capabilities, for example, including but not limited to a slow-moving wireless apparatus, a fast-moving vehicle-mounted device, or a network control node having wireless transmission and reception capabilities, etc., which is not limited in the present disclosure. It is to be understood that the embodiments of the present disclosure are mainly used in scenes of the V2X communication, but also may be used in any other D2D communication scenarios, which is not limited in the embodiments of the present disclosure.

Before the terminal device is accessed to the system, it is required to receive system information sent from the network device 30. The network device 30 may broadcast the system information only in a fixed cycle, and thus a certain delay may be generated when the terminal obtains the system information. When the terminal device is formally accessed to the system, it is also required to obtain a timing advance (TA), which may represent a distance between the terminal device and the network device. The terminal transmits a signal ahead of the TA value. Thus, it may be avoided the case that different terminal devices reach a base station at different time due to a transmission delay. The terminal device needs to send a known sequence to the network device to obtain the TA value. After calculating the TA value out based on this known sequence, the network device informs the terminal of the size of the TA value. Therefore, a certain delay also may be generated in the process when the terminal obtains TA information. The system information and the TA value obtained jointly constitute a portion of delay when the terminal is initially accessed to the system. In a 5G new radio system, it is required to greatly reduce the transmission delay. However, an important aspect of reducing the transmission delay is to reduce the delay generated when the terminal device is initially accessed to the system. For example, in the present disclosure, the transmission delay caused in the process of obtaining the system information and the TA by the terminal is reduced. According to the communication method and the terminal device provided by the embodiments of the present disclosure provide, the system information and the TA used to access the system are received from other terminal devices by way of D2D communication, which can avoid the delay generated when the terminal device is initially accessed to the system.

Figure 2:
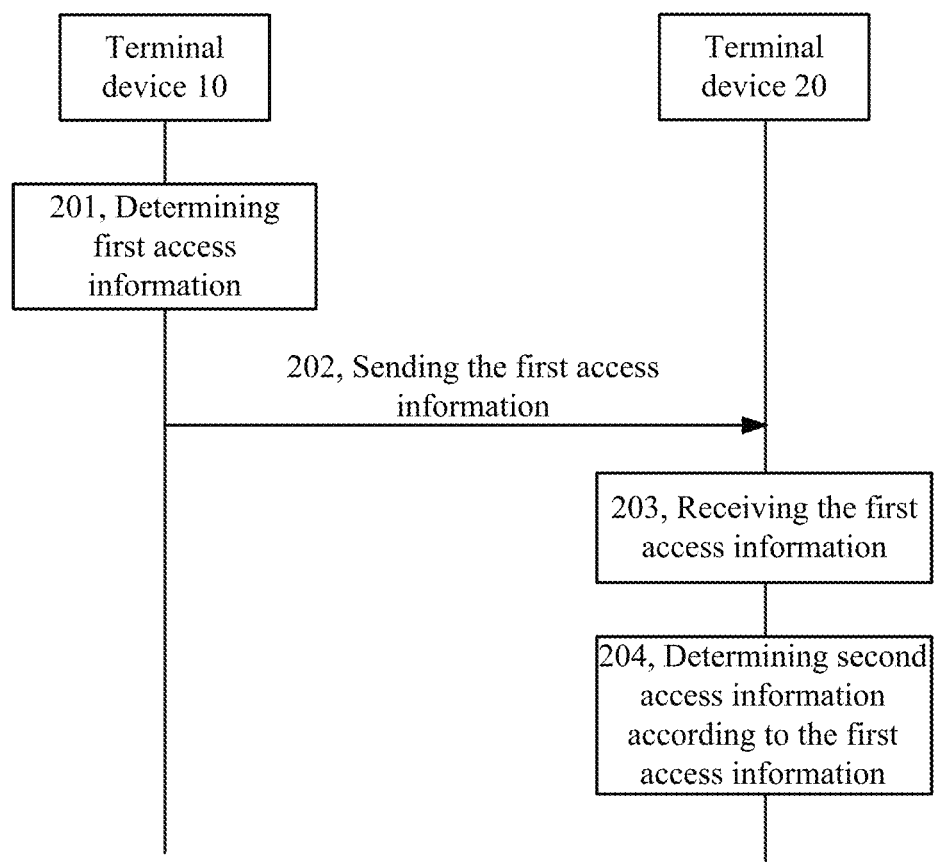
FIG. 2 is a process interaction diagram of a method for D2D communication according to an embodiment of the present disclosure.

FIG. 2 schematically illustrates a process interaction diagram of a method for D2D communication according to an embodiment of the present disclosure. This method may be used in the above wireless communication system. The embodiments of the present disclosure are described by taking the terminal device 10 and the terminal device 20 as an example, but the embodiments of the present disclosure are not limited thereto. In the method for D2D communication according to the embodiments of the present disclosure, the terminal device 10 may send access information to a plurality of terminal devices including the terminal device 20. Reference may be made to the method performed by the terminal device 20 for methods performed by other terminal devices having received the access information, and thus their detailed descriptions are omitted herein for brevity. As shown in FIG. 2, the method for D2D communication includes following steps.

In Step S201, the terminal device 10 determines first access information.

The first access information is used to access a first cell. For example, the access information may include system information and a TA value used to access the first cell and other information used to access the first cell, wherein the first cell includes a cell that is accessible based on the first access information. The terminal device 10 may implement an initial access in the first cell based on the first access information.

As another embodiment, the first access information includes first system information used to access the first cell, and/or the terminal device 10 is configured to access a first TA of the first cell.

Specifically, the terminal device 10 determines the first access information used to access the first cell. The first access information may be received by the terminal device 10 from the network device 30, or may be received by the terminal device 10 from other terminal devices. For example, the first access information includes first system information. The first system information may be current system information of the cell broadcasted by the network device 30, or may be system information broadcasted or sent by other terminal devices to the terminal device 10. After having received the first system information, the terminal device 10 may obtain basic information of a cellular system of the first cell where the terminal device 10 is. For another example, the first access information may include a first TA, which may be a TA calculated out by the network device 30 after the terminal device 10 sends a particular sequence to the network device 30, or may be a TA broadcasted or sent by other terminal devices to the terminal device 10. After having received the first TA, the terminal device 10 may transmit an access signal to the network device 30 based on the first TA.

As another embodiment, in Step S201, the determining first access information by the terminal device 10 includes: determining the first access information by the terminal device 10 based on a movement speed of the terminal device 10.

Specifically, when the movement speed of a terminal device is fast, some information (such as a TA value) in the access information broadcasted by the terminal device is low in available reference value. At this moment, the movement speed of the terminal device may be limited. The network device 30 may deploy, by means of broadcast message, a terminal device whose movement speed exceeds a certain threshold unnecessary to broadcast the above access information; or the terminal device only broadcasts the system information instead of the TA, and in the meanwhile, the terminal device may provide information on its own movement speed to provide the terminal device receiving the access information for reference.

In Step S202, the terminal device 10 sends the first access information.

Specifically, a terminal device (such as the terminal device 10) having obtained the system information and the TA value may send the obtained first access information to other terminal devices such as the terminal device 20, the terminal device 40, the terminal device 50 and so on. After receiving the first access information sent from the terminal device 10, these terminal devices may determine, based on the first access information, second access information used to access a second cell.

Optionally, sending the first access information by the terminal device 10 includes: broadcasting the first access information by the terminal device 10.

For example, the terminal device 10 may send the first access information by way of SideLink (SL) broadcast. In the D2D communication or the V2V communication/V2X communication, the terminal device may broadcast a data packet, such that other terminal devices supporting the D2D communication/V2V communication/V2X communication may receive or discover the first access information. In the 3rd Generation Partnership Project (3GPP), this link formed by directly connecting terminal devices is referred to as an SL.

As another embodiment, the sending the first access information by the terminal device 10 includes:

sending, by the terminal device 10, the first system information and the first TA and the movement speed of the terminal device 10 if the movement speed of the terminal device 10 is less than or equal to a speed threshold; or sending, by the terminal device 10, the first system information and the movement speed of the terminal device 10 if the movement speed of the terminal device 10 is greater than the speed threshold.

For example, in the case that the movement speed of the terminal device 10 is less than or equal to the speed threshold, the terminal device 10 may send the first access information obtained by itself. The first access information may include, for example, the first TA and the first system information, etc. The terminal device 10 may also send the movement speed of the terminal device 10 to provide a reference for the terminal device 20 receiving the first access information. In the case that the movement speed of the terminal device 10 is greater than the speed threshold, the available reference value of the first TA is little, and thus the first access information may not include the first TA and only include the first system information and other access information low correlated to the movement speed. At this moment, the terminal device 10 may send the first system information to the terminal device 20, and may also send the movement speed of the terminal device 10.

It is to be understood that when the movement speed of the terminal device 10 is equal to the speed threshold, the terminal device 10 may send or not send the first TA. Here the speed threshold indicative of whether the terminal device 10 sending the first TA also may be two preset speed thresholds. The first TA is sent when the movement speed of the terminal device 10 is less than the first speed threshold. The first TA is not sent when the movement speed of the terminal device 10 is greater than the second speed threshold. When the movement speed of the terminal device 10 falls in between the two speed thresholds, the terminal device 10 may determine the reliability of its own first TA in other ways so as to decide whether to send the first TA. No limitation is imposed here.

As another embodiment, before the terminal device 10 sends the first access information (i.e., before Step S202), the method may further include:

receiving, by the terminal device 10, indication information sent from the network device 30, the indication information being used for indicating the terminal device 10 to send the access information.

In Step S202, the sending the first access information by the terminal device 10 includes: sending the first access information by the terminal device 10 based on the indication information.

That is, the network device 30 may indicate whether the terminal device 10 sends or broadcasts the first access information, and only after the terminal device 10 receives the indication information sent from the network device 30 (i.e., after receiving configuration or scheduling of the network device 30) may the above access information be sent or broadcasted.

As another embodiment, in Step S202, the sending the first access information by the terminal device 10 includes:

sending a plurality pieces of first access information by the terminal device 10, causing the terminal device 20 to determine, based on the plurality pieces of first access information as received, the second access information used by the terminal device 20 to access the second cell, wherein the plurality pieces of first access information correspond to a plurality of first cells one to one, and each piece of first access information among the plurality pieces of first access information is used to access a corresponding first cell.

Specifically, the plurality pieces of first access information may be different access information from a plurality of first cells. If the terminal device 10 is at the edge location of a cell, the terminal device 10 may have a plurality pieces of first access information of a plurality of adjacent cells, for example, a plurality pieces of first access information obtained from terminal devices of other cells. At this moment, the first access information in Step S202 may be a plurality pieces of first access information such as the first access information of the first cell currently accessed for the terminal device 10, and first access information received, by the terminal device 10, from terminal devices of other adjacent cells to access other cells. The terminal device 20 may determine the second access information based on the plurality pieces of first access information.

Optionally, the terminal device 10 also may send cell IDs of a plurality of cells respectively corresponding to a plurality pieces of first access information and TA values respectively used to access these cells, etc.

Optionally, if the first access information includes first system information, a plurality pieces of first system information in a plurality pieces of first access information may likely have a portion of identical information and a portion of different information. At this moment, in the case that the terminal device 10 sends the first system information of the currently-accessed first cell, the terminal device 10 also may send that portion of different information in other first system information, and also may indicate which portion of the other first system information is the same as or different from the first system information of the currently-accessed first cell.

Optionally, the terminal device 10 also may send time difference information when sending the plurality pieces of first access information, wherein the time difference information is a differential between moments of obtaining signals from different cells by the terminal device 10.

For example, the time difference may be a time difference between primary synchronization signals (PSS) of different cells detected by the terminal device 10, or may be a time difference between secondary synchronization signals (SSS).

In Step S203, the terminal device 20 receives the first access information sent from the terminal device 10.

The first access information is used to access a first cell.

Specifically, after receiving the first access information sent from the terminal device 10, the terminal device 20 may determine, based on the first access information, second access information used to access a to-be-accessed second cell. It is to be understood that at this moment the terminal device 20 also may simultaneously receive access information sent from other terminal devices to respectively access cells, and the terminal device 20 may determine, in at least one piece of access information received, second access information used by the terminal device 20 to access the second cell. For example, the terminal device 20 may select the first access information sent from the terminal device 10 as the second access information used to access the second cell.

In Step S204, the terminal device 20 determines, based on the first access information, the second access information used to access the second cell.

Specifically, after receiving the first access information sent from the terminal device 10, the terminal device 20 may determine, based on the first access information, the second access information used to access the second cell.

The second cell may be a cell the same as the first cell, or may be a cell different from the first cell.

Optionally, the first access information includes first system information used to access the first cell, and the second access information includes second system information used by the terminal device 20 to access the second cell; and/or the first access information includes a first TA used by the terminal device 10 to access the first cell, and the second access information includes a second TA used by the terminal device 20 to access the second cell.

Specifically, when the first access information sent from the terminal device 10 to the terminal device 20 includes the first system information, the terminal device 20 may determine, based on the first system information, the second system information used by the terminal device 20 to access the second cell. When the first access information includes the first TA, the terminal device 20 may determine, based on the first TA, the second TA used to access the second cell. It is to be understood that the terminal device 20 may simultaneously receive access information sent from a plurality of terminal devices, and respectively obtain the first TA and the first system information from different access information, which is not limited here.

In the process of obtaining, by the terminal device 10, the first access information used to access the first cell, signaling interaction between the terminal device 10 and the network device 30 may likely cause delay to the process of obtaining the first access information, which makes the terminal device 10 and other terminal devices reach the network device 30 at different time. Therefore, in the embodiments of the present disclosure, different terminal devices obtain access information used for accessing a cell by way of D2D communication, which can reduce delay generated by obtaining the access information used for accessing the cell from a network device by a terminal device.

As another embodiment, in Step S204, the receiving, by the terminal device 20, first access information sent from the terminal device 10 includes:

receiving, by the terminal device 20, a plurality pieces of first access information sent from the terminal device 10.

The determining, by the terminal device 20 based on the first access information, second access information used by the terminal device 20 to access a second cell includes:

determining, by the terminal device 20 based on the plurality pieces of first access information, the second access information used by the terminal device 20 to access the second cell.

Specifically, if the terminal device 10 is at the edge location of a cell, the terminal device 10 may have access information of a plurality of adjacent cells, for example, access information of a plurality of cells obtained from other devices. At this moment, the terminal device 20 may receive a plurality pieces of first access information sent from the terminal device 10, such that the terminal device 20 may determine the second access information based on the plurality pieces of first access information.

For example, the second terminal device may detect a signal quality or signal power of the plurality pieces of first access information. Supposing the signal quality (or the signal power) of the first access information of the currently-accessed first cell of the first terminal device is the best (highest), the second terminal device may select the first access information of the currently-accessed first cell. For example, the terminal device 20 may select, from the plurality pieces of first access information, the first access information as the second access information to access the first cell corresponding to the first access information. At this moment, the second cell is the first cell corresponding to the first access information.

Optionally, after receiving the plurality pieces of first access information, the terminal device 20 also may receive time difference information sent from the terminal device 10, wherein the time difference information is a differential between moments of obtaining signals from different cells by the terminal device 10.

In this way, the terminal device 20 may guide the process of receiving the access information based on the time difference information, such that signals from other cells or adjacent cells may be detected within shorter time.

Figure 3:
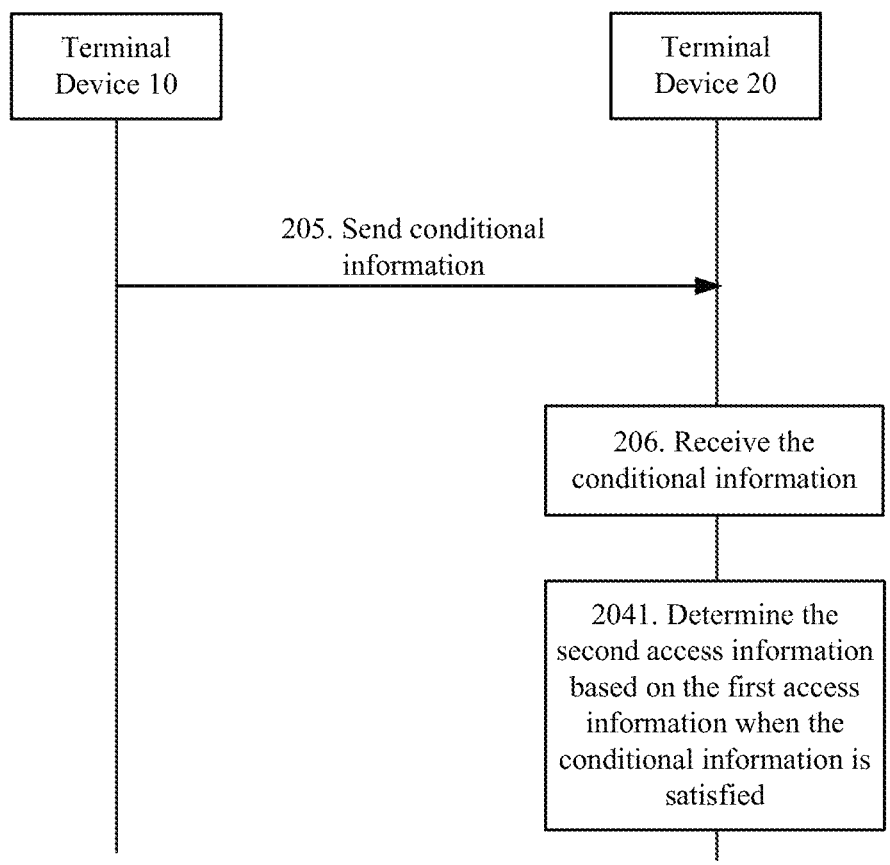
FIG. 3 is a process interaction diagram of a method for D2D communication according to another embodiment of the present disclosure.

As another embodiment, FIG. 3 illustrates a process interaction diagram of a method for D2D communication according to another embodiment of the present disclosure, wherein the method may include Step S205 and Step S206.

Step S205: the terminal device 10 sends condition information.

The condition information is used for indicating the terminal device 20 to determine the second access information based on the first access information when a condition indicated by the condition information is satisfied.

Optionally, the condition information includes at least one piece of following information:

location condition information, time condition information, a cell ID of the first cell, and the movement speed of the terminal device 10.

Step S206: the terminal device 20 receives the condition information.

It is to be understood that the condition information received by the terminal device 20 may be the condition information sent from the terminal device 10, or may be the condition information received, by the terminal device 20, from the network device 30.

In this case, Step S204 in FIG. 2 may be replaced with Step 2041.

In Step 2041, the terminal device 20 determines the second access information based on the first access information when a condition indicated by the condition information is satisfied.

Specifically, after the first access information sent from the terminal device 10 is received by other terminal devices, the first access information is not used unconditionally but used with certain use condition, for example, the location condition information, the time condition information, the cell ID of the first cell, and the movement speed of the terminal device 10, etc. The terminal device satisfying the use condition may determine, based on the first access information, the second access information currently used by the terminal device to access a cell.

In this way, an efficiency of the terminal device in obtaining access information used for accessing a cell may be enhanced, and a success rate of accessing the cell by using the access information may be increased.

As another embodiment, the time condition information includes a moment when the terminal device 10 receives the first access information from other devices and an effective duration of the first access information.

Specifically, the network device 30 also may indicate the terminal device 20 receiving the first access information to only use the first access information broadcasted by the terminal device 10 within a certain time range. The terminal device 10 may simultaneously broadcast the time condition information configured by the network device 30 or agreed in advance. In this way, after receiving the first access information and the condition information, the terminal device 20 may determine, based on the condition information, whether to determine the second access information based on the first access information sent from the terminal device 10. The terminal device 20 may determine the second access information based on the first access information if the terminal device 20 satisfies a time condition indicated in the time condition information. The first access information may include the first system information and/or the first TA, and may also include other access information used to access a cell.

The moment here may be represented by a time stamp, for example, represented by a time stamp of Universal Time Coordinated (UTC).

The effective duration may represent a time range from a moment when the terminal device 10 receives the first access information to a moment when the terminal device 20 receives the first access information. The first access information can be used by the terminal device 20 to determine the second TA if the moment when the terminal device 20 receives the first access information is within the time range. In this way, after receiving the first access information and the condition information, the terminal device 20 may determine, based on the first access information and the condition information, the second TA used to access the second cell. The effective duration may include an end moment of the first access information. That is, the terminal device 20 may determine, based on the first access information and the condition information, the second TA used to access the second cell if the moment when the terminal device 20 receives the first access information is earlier than the end moment. This is not limited in the present disclosure.

For example, supposing the first access information received from the terminal device 10 by the terminal device 20 includes first access information used to access the first cell, the previous first access information further includes a moment (for example, 14:00) of successfully receiving the first access information by the terminal device 10, and the condition information received by the terminal device includes the effective duration (for example, 30 min) of the first access information. If the current moment of receiving the first access information by the terminal device 20 is 14:20, the time condition indicated by the condition information is satisfied because 20 min is less than 30 min, and thus the terminal device 20 may use the first access information as the second TA used to access the second cell. If the current moment of receiving the first access information by the terminal device 20 is 14:40, the time condition indicated by the condition information is not satisfied because 40 min is greater than 30 min, which means that the first access information has litter reference value, and thus the terminal device 20 may not use the first access information as the second TA used to access the second cell. Instead, the terminal device 20 may determine, from first access information received from other terminal devices, the second TA used to access the second cell.

As another embodiment, the first access information includes a first TA, and the location condition information includes a location of the terminal device 10 when the terminal device 10 receives the first TA from other devices and an effective use distance of the first TA.

Specifically, the TA value is mainly related to a signal propagation path between the terminal device and the network device, and thus may be affected by a radio propagation environment of a cell where the network device is. Therefore, the network device 30 may indicate the terminal device 20 to only use TA information broadcasted by a terminal device within a certain range. The terminal device 10 broadcasting the first access information may simultaneously send the effective use distance configured by the network device 30. Thus after receiving the first access information and the condition information, the terminal device 20 may determine, based on the condition information, whether to determine the second TA based on the first TA sent from the terminal device 10. The terminal device 20 may determine the second access information based on the first access information if the terminal device 20 satisfies a location condition indicated by the location condition information.

It is to be understood that the effective use distance may represent a maximum distance between the terminal device 20 and the terminal device 10. That is, the terminal device 20 may determine the second TA based on the first TA if the distance between the terminal device 20 and the terminal device 10 is smaller than the maximum distance. The effective use distance also may directly indicate at least one of a longitude coordinate range, a latitude coordinate range and a height coordinate range of the terminal device that can use the first TA. That is, the terminal device 20 may determine the second TA based on the first TA if the location of the terminal device 20 satisfies at least one of the longitude coordinate range, the latitude coordinate range and the height coordinate range, which is not limited in the present disclosure.

For example, supposing the first access information received from the terminal device 10 by the terminal device 20 includes the first TA used by the terminal device 10 to access the current cell, the first access information further includes a location of the terminal device 10 when successfully receiving the first TA. The condition information received from the terminal device 10 by the terminal device 20 includes the effective use distance of the first TA. For example, the location within a range of 500 m away from the terminal device 10 is the effective use distance satisfying the condition.

After receiving the first access information, the terminal device 20 calculates, based on the location of the terminal device 10 when receiving the first TA and the current location of the terminal device 20 in the first access information, the distance between the location of the terminal device 10 when receiving the first TA and the location of the terminal device 20. If the distance between the terminal device 20 and the terminal device 10 is less than 500 m, the terminal device 20 may determine the first TA as the second TA used to access the cell, that is, the second TA may be the same as the first TA. If the distance between the terminal device 20 and the terminal device 10 is greater than 500 m, the second TA is different from the first TA. In this case, the terminal device 20 may determine, from first access information received from other terminal devices, the second TA used to access the cell.

Optionally, the network device 30 may configure the above condition information (for example, the effective use distance, the effective duration and so on) by way of broadcast or dedicated signaling.

As another embodiment, the condition information may further include a cell ID of the first cell. In Step 204, the determining, by the terminal device 20 based on the first access information, the second access information used by the terminal device 20 to access the second cell includes:

determining, by the terminal device 20 based on the first access information, the second access information used to access the second cell if a cell ID of the second cell to be accessed for the terminal device 20 is the same as the cell ID of the first cell.

Thus, when other terminal devices including the terminal device 20 receive the first access information and the condition information, these terminal devices may determine, based on cell ID information, whether to determine the second access information used to access the second cell based on the first access information. Only when the cell ID of the second cell to be accessed for the terminal device 20 is the same as the cell ID of the first cell may the terminal device 20 determine the second access information based on the first access information.

Specifically, after the terminal device 20 accesses the second cell, cell synchronization is implemented, and the cell ID of the second cell is detected. After receiving the first access information sent from the terminal device 10, the terminal device 20 may determine the second access information used to access the second cell based on the first access information if the cell ID of the first cell included in the first access information is consistent with the cell ID of the second cell to be accessed for the terminal device 20. The terminal device 20 may be likely within a region where edges of two cells are overlapped. In this case, the terminal device 20 may likely receive access information sent from terminal devices respectively from the two cells. For example, the terminal device 20 may receive the first access information sent from the terminal device 10 positioned in the second cell to be accessed currently and fourth access information sent from a terminal device 40 positioned in another cell. In this case, the terminal device 20 needs to compare the detected cell ID of the second cell with a cell ID in the first access information received by the terminal device 20. The terminal device 20 may determine the second access information based on the first access information if the cell ID of the first cell in the first access information is the same as the cell ID of the second cell detected by the terminal device 20. The terminal device 20 may not determine the second access information based on the fourth access information if the cell ID in the fourth access information is different from the cell ID of the second cell detected by the terminal device 20.

It is to be understood that when the cell ID of the first cell in this embodiment is the same as the cell ID of the second cell, this indicates that the second cell is the same as the first cell. That is, if access information of each cell is different, only when the second cell to be accessed for the terminal device 20 and the first cell currently accessed for the terminal device 10 are the same cell may the terminal device 20 determine the second access information used to access the second cell based on the first access information. However, this does not mean that the terminal device 20 cannot use the first access information to access the second cell if the cell ID of the first cell is different from the cell ID of the second cell. For instance, the network device 30 may configure the same system information for different cells. For example, when basic information (for example, parameter such as subcarrier bandwidth) of cellular systems used by two adjacent cells (for example, the first cell and the second cell here) is the same, the first cell and the second cell may use the same system information, and the terminal device 20 may obtain the first system information of the first cell from the first access information, such that the terminal device 20 access the second cell based on the first system information.

It is to be understood that the condition information may be sent from the terminal device 10, or may be sent from the network device 30. That is, the terminal device 20 may receive the condition information sent from the terminal device 10, or may receive the condition information sent from the network device 30. That is, the condition information sent from the terminal device 10 to the terminal device 20 may be configured by the network device 30, or may be determined by the terminal device 10, or may be agreed in a protocol, which is not limited herein.

As another embodiment, the first access information includes a first TA used by the terminal device 10 to access the first cell. The condition information includes a movement speed of the terminal device 10. In Step 240, the determining, by the terminal device 20 based on the first access information, the second access information used to access the second cell includes:

determining, by the terminal device 20 based on the first TA, the second TA used to access the second cell if the movement speed of the terminal device 10 is less than or equal to the speed threshold.

That is, when the movement speed of the terminal device 10 is fast, an available reference value for a TA value broadcasted by the terminal device 10 is low. Therefore, when the terminal device 20 receives the first TA sent from the terminal device 10, the terminal device 20 may determine the movement speed of the terminal device 10 based on the condition information. If the movement speed of the terminal device 10 is low, for example, the movement speed of the terminal device 10 is less than the speed threshold or the terminal device 10 holds still, the terminal device 20 may determine, based on the first TA, the second TA used to access the second cell, i.e., the first TA may be used. The terminal device 20 may not use the first TA if the movement speed of the terminal device 10 is higher, for example, the movement speed of the terminal device 10 is greater than the speed threshold.

The terminal device 10 in the embodiments of the present disclosure refers to a terminal device that can send the first access information used to access a cell. That is, the terminal device 10 is a terminal device that can send its own first access information to other terminal devices. For the terminal device 10 described above, reference is made by taking one terminal device as an example. In actual situations, the terminal device 20 may receive a plurality pieces of access information sent from a plurality of terminal devices 10. A specific description is made below.

As another embodiment, the receiving, by a terminal device 20, first access information sent from a terminal device 10 includes: receiving, by the terminal device 20, a plurality pieces of first access information respectively sent from a plurality of first terminal devices 10.

The determining, by the terminal device 20 based on the first access information, second access information used by the terminal device 20 to access a second cell includes:

determining, by the terminal device 20, a target terminal device from the plurality of terminal devices 10 based on speed information or location information of each of the plurality of terminal devices 10; and determining the second access information by the terminal device 20 based on the first access information of the target terminal device.

Specifically, after the terminal device 20 receives a plurality pieces of access information sent from a plurality of terminal devices 10, the terminal device 20 determines a target terminal device 10 from the plurality of terminal devices 10 based on speed information or location information of each of the plurality of terminal devices 10, and the terminal device 20 may access the second cell by using the first access information of the target terminal device. For example, the first access information of the terminal device 10 among the plurality of terminal devices 10 nearest to the terminal device 20 is used as the second access information to access the second cell; or the first access information of the terminal device 10 among the plurality of terminal devices 10 having the slowest movement speed or holding still is used as the second access information to access the second cell.

As another embodiment, before determining, by the terminal device 20, a target terminal device from the plurality of terminal devices 10 based on speed information or location information of each of the plurality of terminal devices 10, the method further includes:

determining, by the terminal device 20, a condition indicated by the condition information of each of the plurality of terminal devices 10.

The determining, by the terminal device 20, a target terminal device from the plurality of terminal devices 10 based on speed information or location information of each of the plurality of terminal devices 10 includes:

The terminal device 20 determines, from the plurality of terminal devices 10, a terminal device 10 having the slowest movement speed as the target terminal device, or determines, from the plurality of terminal devices 10, a terminal device 10 nearest to the terminal device 20 as the target terminal device.

For example, the terminal device 20 may determine whether the terminal device 20 satisfies the condition information by comparing the location of the terminal device 20 when the terminal device 20 receives first access information with the location of the terminal device 10 when the terminal device 10 receives the first access information and in combination with the condition information such as an effective use distance; or the terminal device 20 may determine whether the terminal device 20 satisfies the condition information by comparing the moment when the terminal device 20 receives the first access information with the moment when the terminal device 10 receives the first access information and in combination with the condition information such as an effective duration in the condition information.

The terminal device 20 simultaneously receives the plurality pieces of first access information sent from the plurality of terminal devices 10, and the terminal device 20 satisfies a condition indicated in the condition information of each of the terminal devices 10. If a certain terminal device 10 is the nearest to the terminal device 20, the terminal device 20 may use the first access information sent from the terminal device 10 the nearest to the terminal device 20; or if a certain terminal device 10 has the slowest movement speed, the terminal device 20 may use the first access information sent from the terminal device 10 having the slowest movement speed.

Optionally, after Step 204, the method may further include: accessing the terminal device 20 to the second cell based on the second access information.

After determining the second access information used to access the second cell, the terminal device 20 may access the second cell based on the second access information. It is unnecessary to obtain the second access information from the network device 30, which may reduce delay caused by initially accessing a system. In this way, a signal sent from the terminal device 20 and signals sent from other terminal devices may simultaneously reach the network device 30.

Optionally, after Step 204, the method may further include: sending the second access information by the terminal device 20.

Optionally, the second access information may further include the second system information and/or the second TA.

For example, the terminal device 20 broadcasts the second access information, such that other terminal devices may obtain the access information to access the cell in the same way as mentioned above.

It is to be understood that reference may be made to the above procedures of sending the first access information by the terminal device 10 for procedures of sending the second access information by the terminal device 20, and thus their detailed descriptions are omitted herein for brevity.

It is also to be understood that the cell may update its own system information, and the TA value of the cell also may be constantly changed with the movement of the terminal device. Therefore, the terminal device may send its own updated access information according to a certain rule of time.

It is also to be understood that in the embodiments of the present disclosure, a sequence number of each procedure does not mean an execution sequence, and the execution sequence of each procedure shall be determined by its function and an internal logic, and shall not impose a limit on the implementation process of the embodiments of the present disclosure.

The method for D2D communication according to the embodiments of the present disclosure is described in detail above with reference to FIG. 1-FIG. 3, and the terminal device according to the embodiments of the present disclosure will be described in detail below with reference to FIG. 4-FIG. 15. It is to be understood that the terminal device according to the embodiments of the present disclosure may perform the foregoing methods according to the embodiments of the present disclosure. That is, reference may be made to the corresponding procedures of the foregoing method embodiments for specific work procedures of following devices.

Figure 4:
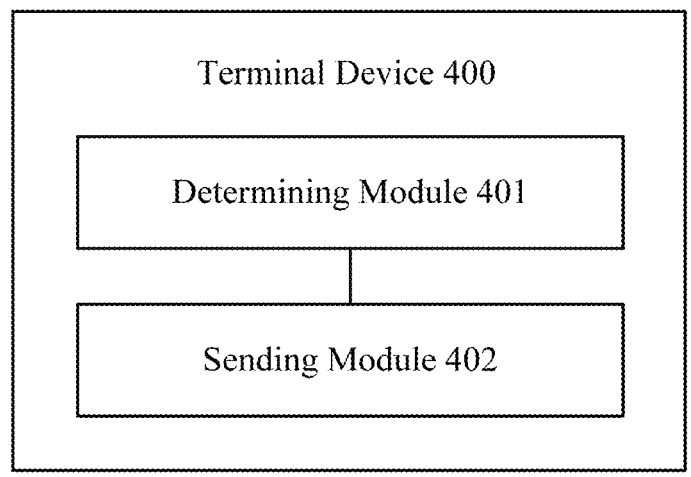
FIG. 4 is a structure block diagram of a D2D device according to an embodiment of the present disclosure.
Figure 5:
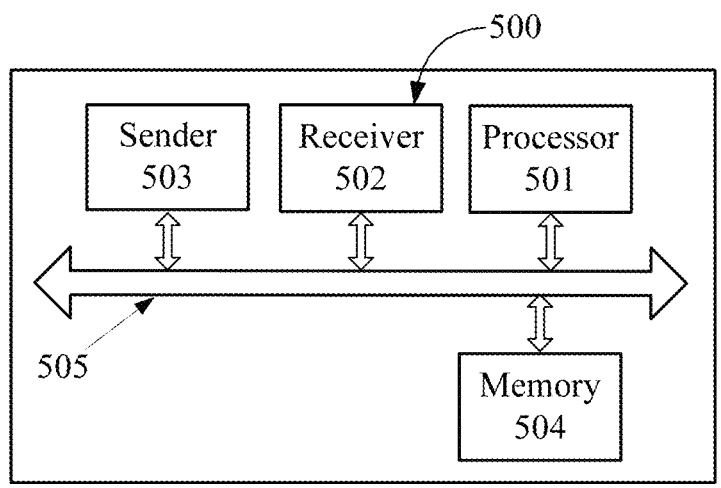
FIG. 5 is a structure block diagram of a D2D device according to an embodiment of the present disclosure.

FIG. 4 illustrates a schematic block diagram of a terminal device 400 according to an embodiment of the present disclosure. As shown in FIG. 4, as a first terminal device, the terminal device 400 includes a determining module 401 and a sending module 402.

The determining module 401 is configured to determine first access information, wherein the first access information is used to access a first cell.

The sending module 402 is configured to send the first access information determined by the determining module, causing a second terminal device to determine, based on the first access information as received, second access information used by the second terminal device to access a second cell.

Thus, different terminal devices obtain access information used for accessing a cell by way of D2D communication, which can reduce delay generated by obtaining the access information from a network device by a terminal device.

Optionally, the first access information includes first system information used to access the first cell, and the second access information includes second system information used by the second terminal device to access the second cell; and/or the first access information includes a first timing advance (TA) used by the first terminal device to access the first cell, and the second access information includes a second TA used by the second terminal device to access the second cell.

Optionally, the sending module 402 is also configured to:
send condition information, wherein the condition information is used for indicating the second terminal device to determine the second access information based on the first access information when a condition indicated by the condition information is satisfied.

Optionally, the condition information includes at least one piece of following information: location condition information, time condition information, speed condition information, and information of a cell ID of the first cell.

Optionally, the time condition information includes a moment when the first terminal device receives the first access information from other devices and an effective duration of the first access information.

Optionally, the first access information includes a first TA, and the location condition information includes a location of the first terminal device when the first terminal device receives the first TA from other devices and an effective use distance of the first TA.

Optionally, the determining module 401 is specifically configured to determine the first access information based on a movement speed of the first terminal device.

Optionally, the sending module 402 is specifically configured to:
send the first system information and the first TA and the movement speed of the first terminal device if the movement speed of the first terminal device is less than or equal to a speed threshold; or
send the first system information and the movement speed of the first terminal device if the movement speed of the first terminal device is greater than the speed threshold.

Optionally, before the sending module 402 sends the first access information, the terminal device further includes:
a receiving module 403, configured to receive indication information sent from the network side device, wherein the indication information is used for indicating the first terminal device to send the access information.

The sending module 402 is specifically configured to send the first access information based on the indication information.

Optionally, the sending module 402 is also configured to send a plurality pieces of first access information, causing the second terminal device to determine, based on the plurality pieces of first access information as received, the second access information used by the second terminal device to access the second cell, wherein the plurality pieces of first access information correspond to a plurality of first cells one to one, and each piece of first access information among the plurality pieces of first access information is used to access a corresponding first cell.

Optionally, the sending module 402 is specifically configured to broadcast the first access information.

Figure 6:
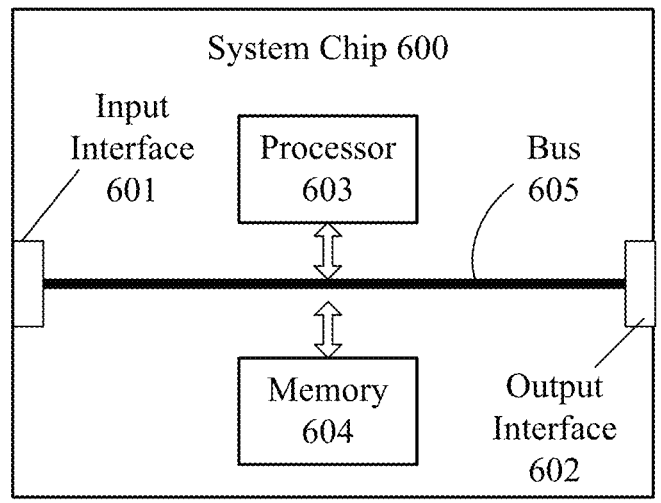
FIG. 6 is a schematic structural diagram of a system chip according to an embodiment of the present disclosure.

It is to be noted that in the embodiments of the present disclosure, the determining module 401 may be implemented by a processor, the sending module 402 may be implemented by a sender, and the receiving module 703 may be implemented by a receiver. As shown in FIG. 6, the terminal device 500 may include a processor 501, a receiver 502, a sender 503, and a memory 504, wherein the receiver 502 and the sender 503 may be collectively referred to as a transreceiver. The memory 504 may be configured to store an instruction and also may be configured to store a code executed by the processor 501, etc. Each component of the terminal device 500 is coupled through a bus system 505, wherein the bus system 505 includes a data bus, and further includes a power bus, a control bus, and a status signal bus. The processor 501 is specifically configured to:

determine first access information, the first access information being used to access a first cell.

The sender 503 is configured to send the first access information determined by the processor 501, causing a second terminal device to determine, based on the first access information as received, second access information used by the second terminal device to access a second cell.

Thus, different terminal devices obtain access information used for accessing a cell by way of D2D communication, which can reduce delay generated by obtaining the access information from a network device by a terminal device.

Optionally, the first access information includes first system information used by the first terminal device to access the first cell, and the second access information includes second system information used by the second terminal device to access the second cell; and/or the first access information includes a first timing advance (TA) used by the first terminal device to access the first cell, and the second access information includes a second TA used by the second terminal device to access the second cell.

Optionally, the sender 503 is also configured to:

send condition information, wherein the condition information is used for indicating the second terminal device to determine the second access information based on the first access information when a condition indicated by the condition information is satisfied.

Optionally, the condition information includes at least one piece of following information: location condition information, time condition information, speed condition information, and information of a cell ID of the first cell.

Optionally, the time condition information includes a moment when the first terminal device receives the first access information from other devices and an effective duration of the first access information.

Optionally, the first access information includes a first TA, and the location condition information includes a location of the first terminal device when the first terminal device receives the first TA from other devices and an effective use distance of the first TA.

Optionally, the processor 501 is specifically configured to determine the first access information based on a movement speed of the first terminal device.

Optionally, the sender 503 is specifically configured to:

send the first system information and the first TA and the movement speed of the first terminal device if the movement speed of the first terminal device is less than or equal to a speed threshold; or send the first system information and the movement speed of the first terminal device if the movement speed of the first terminal device is greater than the speed threshold.

Optionally, before the sender 503 sends the first access information, the terminal device further includes:

a receiver 502, configured to receive indication information sent from the network side device, the indication information being used for indicating the first terminal device to send the access information.

The sender 503 is specifically configured to send the first access information based on the indication information.

Optionally, the sender 503 is also configured to send a plurality pieces of first access information, causing the second terminal device to determine, based on the plurality pieces of first access information as received, the second access information used by the second terminal device to access the second cell, wherein the plurality pieces of first access information correspond to a plurality of first cells one to one, and each piece of first access information among the plurality pieces of first access information is used to access a corresponding first cell.

Optionally, the sender 503 is specifically configured to broadcast the first access information.

FIG. 6 is a schematic structural diagram of a system chip according to an embodiment of the present disclosure. The system chip 600 in FIG. 6 includes an input interface 601, an output interface 602, at least one processor 603, and a memory 604. The input interface 601, the output interface 602, the processor 603 and the memory 604 are connected by a bus 605. The processor 603 is configured to execute a code stored in the memory 604. When the code is executed, the processor 603 implements the method performed by the first terminal device in FIG. 2 or FIG. 3.

Figure 7:
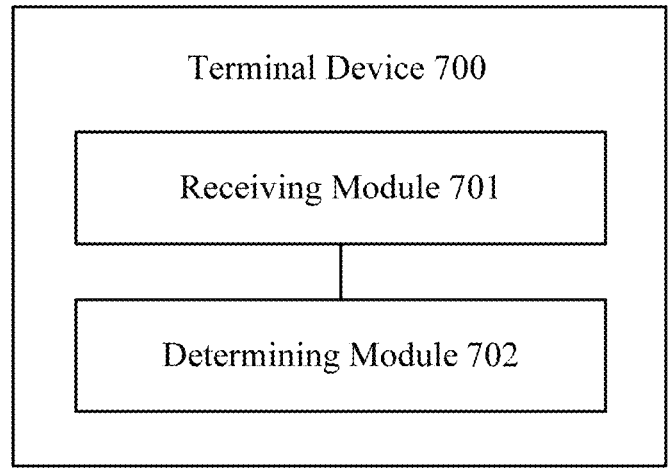
FIG. 7 is a structure block diagram of a D2D device according to another embodiment of the present disclosure.

FIG. 7 illustrates a schematic block diagram of a terminal device 700 according to an embodiment of the present disclosure. As shown in FIG. 7, as a second terminal device, the terminal device 700 may include a receiving module 701 and a determining module 702.

The receiving module 701 is configured to receive first access information sent from a first terminal device, wherein the first access information is used to access a first cell.

The determining module 702 is configured to determine, based on the first access information determined by the receiving module, second access information used by the second terminal device to access a second cell.

Thus, different terminal devices obtain access information used for accessing a cell by way of D2D communication, which can reduce delay generated by obtaining the access information from a network device by a terminal device.

Optionally, the first access information includes first system information used to access the first cell, and the second access information includes second system information used by the second terminal device to access the second cell; and/or the first access information comprises a first timing advance (TA) used by the first terminal device to access the first cell, and the second access information comprises a second TA used by the second terminal device to access the second cell.

Optionally, before the determining module 702 determines, based on the first access information, second access information used to access the second cell, the receiving module 701 is further configured to receive condition information.

The determining module 702 is specifically configured to determine the second access information based on the first access information when the second terminal device satisfies a condition indicated by the condition information.

Optionally, the condition information includes at least one piece of following information:

location condition information, time condition information, speed condition information, and information of a cell ID of the first cell.

Optionally, the time condition information includes a moment when the first terminal device receives the first access information from other devices and an effective duration of the first access information.

Optionally, the first access information includes a first TA, and the location condition information includes a location of the first terminal device when the first terminal device receives the first TA from other devices and an effective use distance of the first TA.

Optionally, the condition information includes a cell ID of the first cell.

The determining module 702 is specifically configured to determine, based on the first access information, the second access information used to access the second cell if a cell ID of the second cell to be accessed for the second terminal device is the same as the cell ID of the first cell.

Optionally, the first access information includes the first TA, the speed condition information includes a movement speed and a speed threshold of the first terminal device, and the determining module 702 is specifically configured to determine, based on the first TA, a second TA used to access the second cell if the movement speed of the first terminal device is less than or equal to the speed threshold.

Optionally, the receiving module 701 is specifically configured to: receive the condition information sent from the first terminal device; or receive the condition information sent from a network device.

Optionally, the receiving module 701 is specifically configured to receive the first access information respectively sent from a plurality of first terminal devices.

The determining module 702 is specifically configured to: determine a target terminal device from the plurality of first terminal devices based on speed information or location information of each of the plurality of first terminal devices; and determine the second access information based on the first access information of the target terminal device.

Optionally, before the determining module 702 determines a target terminal device from the plurality of first terminal devices based on the speed information or the location information of each of the plurality of first terminal devices, the determining module 702 is specifically configured to:

determine that the second terminal device satisfies a condition indicated by the condition information of each of the plurality of first terminal devices; and determine from the plurality of first terminal devices, a first terminal device having a slowest movement speed as the target terminal device, or determine from the plurality of first terminal devices, a first terminal device nearest to the second terminal device as the target terminal device.

Optionally, the receiving module 701 is also configured to receive a plurality pieces of first access information sent from the first terminal device.

The determining module 702 is specifically configured to determine, based on the plurality pieces of first access information, the second access information used by the second terminal device to access the second cell.

Optionally, the terminal device 700 further includes a sending module 703, which is configured to send the second access information.

Optionally, the sending module 703 is specifically configured to broadcast the second access information.

Figure 8:
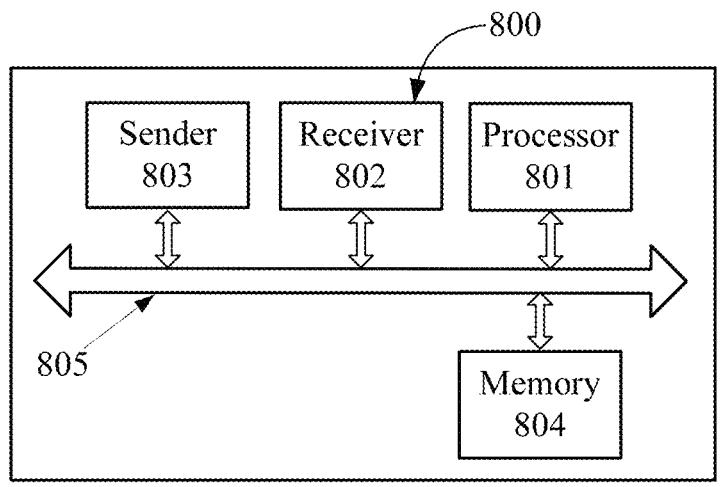
FIG. 8 is a structure block diagram of a D2D device according to another embodiment of the present disclosure.

It is to be noted that in the embodiments of the present disclosure, the determining module 702 may be implemented by a processor, the receiving module 701 may be implemented by a receiver, and the sending module 703 may be implemented by a sender. As shown in FIG. 8, the terminal device 800 may include a processor 801, a receiver 802, a sender 803, and a memory 804, wherein the receiver 802 and the sender 803 may be collectively referred to as a transreceiver. The memory 804 may be configured to store an instruction and also may be configured to store a code executed by the processor 801, etc. Each component of the terminal device 800 is coupled through a bus system 808, wherein the bus system 808 includes a data bus, and further includes a power bus, a control bus, and a status signal bus. The receiver 802 is specifically configured to:

receive first access information sent from a first terminal device, the first access information being used to access a first cell.

The processor 801 is configured to determine, based on the first access information determined by the receiver 802, second access information used by the second terminal device to access a second cell.

Thus, different terminal devices obtain access information used for accessing a cell by way of D2D communication, which can reduce delay generated by obtaining the access information from a network device by a terminal device.

Optionally, the first access information includes first system information used to access the first cell, and the second access information includes second system information used by the second terminal device to access the second cell; and/or the first access information includes a first timing advance (TA) used to access the first cell, and the second access information includes a second TA used by the second terminal device to access the second cell.

Optionally, before the processor 801 determines, based on the first access information, the second access information used to access the second cell, the receiver 802 is further configured to receive condition information.

The processor 801 is configured to determine the second access information based on the first access information when the second terminal device satisfies a condition indicated by the condition information.

Optionally, the condition information includes at least one piece of following information:

location condition information, time condition information, speed condition information, and information of a cell ID of the first cell.

Optionally, the time condition information includes a moment when the first terminal device receives the first access information from other devices and an effective duration of the first access information.

Optionally, the first access information includes a first TA, and the location condition information includes a location of the first terminal device when the first terminal device receives the first TA from other devices and an effective use distance of the first TA.

Optionally, the condition information includes a cell ID of the first cell.

The processor 801 is specifically configured to determine, based on the first access information, the second access information used to access the second cell if a cell ID of the second cell to be accessed for the second terminal device is the same as the cell ID of the first cell.

Optionally, the first access information includes the first TA, and the speed condition information includes a movement speed and a speed threshold of the first terminal device.

The processor 801 is specifically configured to determine, based on the first TA, a second TA used to access the second cell if the movement speed of the first terminal device is less than or equal to the speed threshold.

Optionally, the receiver 802 is specifically configured to receive the condition information sent from the first terminal device or the condition information sent from a network device.

Optionally, the receiver 802 is specifically configured to receive the first access information respectively sent from a plurality of first terminal devices.

The processor 801 is specifically configured to: determine a target terminal device from the plurality of first terminal devices based on speed information or location information of each of the plurality of first terminal devices; and determine the second access information based on the first access information of the target terminal device.

Optionally, before the processor 801 determines the target terminal device from the plurality of first terminal devices based on the speed information or the location information of each of the plurality of first terminal devices, the processor 801 is specifically configured to:

determine that the second terminal device satisfies a condition indicated by the condition information of each of the plurality of first terminal devices; and determine from the plurality of first terminal devices, a first terminal device having a slowest movement speed as the target terminal device, or determine from the plurality of first terminal devices, a first terminal device nearest to the second terminal device as the target terminal device.

Optionally, the receiver 802 is also configured to receive a plurality pieces of first access information sent from the first terminal device.

The processor 801 is specifically configured to determine, based on the plurality pieces of first access information, the second access information used by the second terminal device to access the second cell.

Optionally, the terminal device 800 further includes a sender 803, which is configured to send the second access information.

Optionally, the sender 803 is specifically configured to broadcast the second access information.

Figure 9:
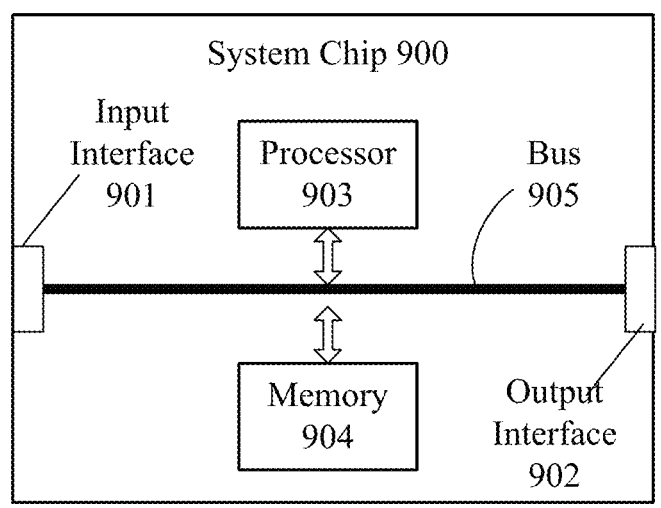
FIG. 9 is a schematic structural diagram of a system chip according to another embodiment of the present disclosure.

FIG. 9 is a schematic structural diagram of a system chip according to an embodiment of the present disclosure. The system chip 900 in FIG. 9 includes an input interface 901, an output interface 902, at least one processor 903, and a memory 904. The input interface 901, the output interface 902, the processor 903 and the memory 904 are connected by a bus 905. The processor 903 is configured to execute a code stored in the memory 904. When the code is executed, the processor 903 implements the method performed by the second terminal device in FIG. 2 or FIG. 3.

It is to be understood that the processor in the embodiments of the present disclosure may be an integrated circuit chip having a signal processing capability. In an implementation process, steps of the foregoing method embodiments may be implemented by using an integrated logic circuit of hardware in the processor or an instruction in a software form. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, steps, and logical block diagrams disclosed in the embodiments of the present disclosure may be implemented or executed. The general-purpose processor may be a microprocessor, or the processor may be any conventional processor or the like. The steps of the methods disclosed in the embodiments of the present disclosure may be directly executed by a hardware decoding processor, or may be executed by a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and implements the steps of the foregoing methods in combination with the hardware of the processor.

It can be understood that the memory in the embodiments of the present disclosure may be a volatile memory or a non-volatile memory, or may include both of a volatile memory and a non-volatile memory. The non-volatile memory may include: a read-only memory (ROM), a programmable ROM (PROM), an erasable PROM (EPROM), an electrically EPROM (EEPROM), or a flash memory. The volatile memory may be a random access memory (RAM), which is used as an external cache. According to description that can be used as an example but imposes no limitation, RAMs of many forms are applicable, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). It is to be noted that the memory in the system and the method described in this specification intends to include, but is not limited to, these memories and any other memory of a suitable type.

Moreover, terms "system" and "network" herein are often used interchangeably herein. It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

It is to be understood that in the embodiments of the present disclosure, "B corresponding to A" represents that the B is associated with the A, and the B may be determined based on the A. It is also to be understood that to determine the B based on the A does not mean that the B is determined merely based on the A, instead, the B may be determined based on the A and/or other information.

Persons of ordinary skill in the art may realize that it is possible to implement, by electronic hardware or a combination of computer software and electronic hardware, steps of units and methods in various examples as described in the embodiments disclosed herein. Whether these functions are executed in a hardware mode or a software mode depends on specific applications and design constraints on the technical solutions. Technical professionals may use different methods to implement functions as described in each of the specific applications. However, the implementation shall be not believed beyond the scope of the present disclosure.

From several embodiments provided in the present disclosure, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For example, multiple units or components may be combined or integrated into another system, or some features may be ignored and not executed. For another thing, intercoupling or direct coupling or communications connection displayed or discussed may be indirect coupling or communications connection, electrical or mechanical or in other forms, by means of some interfaces, apparatuses or units.

The unit serving as a detached component may be or not be physically detached, the component serving as a unit display may be or not be a physical unit, i.e., either located at one place or distributed on a plurality of network elements. Units may be selected in part or in whole according to actual needs for achieving objectives of the solution of this embodiment.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solution of the present disclosure in essence or that part of contribution to the prior art or a part of the technical solution may be embodied in the form of software products, which may be stored in a storage medium, comprising some instructions to cause a computer device (a personal computer, a server or a network device and so on) to execute all or a part of steps of the method as recited in the embodiments of the present disclosure. The aforementioned storage medium comprises: a USB flash disk, a mobile hard disk, a read-only memory (ROM), a random access memory (RAM), a magnetic disk or an optical disk and other media capable of storing a program code.

The abovementioned embodiments are merely the embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the protection scope of the present disclosure shall be subject to that of the claims.

What is claimed is:

1. A method for device-to-device D2D communication, characterized in comprising:
   determining first access information by a first terminal device, the first access information being used to access a first cell; and
   sending condition information and the first access information by the first terminal device, causing a second terminal device to determine, based on the first access information as received when a condition indicated by the condition information is satisfied, second access information used by the second terminal device to access a second cell,
   wherein the condition information comprises a movement speed and a speed threshold of the first terminal device, and
   wherein the sending the first access information by the first terminal device comprises:
      sending, by the first terminal device, a first TA used to access the first cell and the movement speed of the first terminal device if the movement speed of the first terminal device is less than or equal to the speed threshold, the first TA is used by the second terminal to determine a second TA used to access the second cell.

2. The method according to claim 1, wherein the first access information further comprises first system information used to access the first cell, and the second access information further comprises second system information used by the second terminal device to access the second cell.

3. The method according to claim 1, wherein the condition information further comprises at least one piece of following information:
   location condition information, time condition information, and information of a cell ID of the first cell.

4. The method according to claim 3, wherein the location condition information comprises a location of the first terminal device when the first terminal device receives the first TA from other devices and an effective use distance of the first TA.

5. The method according to claim 1, wherein before sending the first access information by the first terminal device, the method further comprises:
   receiving, by the first terminal device, indication information sent from a network side device, the indication information being used for indicating the first terminal device to send the access information; and
   the sending the first access information by the first terminal device comprises:
   sending the first access information by the first terminal device based on the indication information.

6. The method according to claim 1, wherein the sending the first access information by the first terminal device comprises at least one of:
   sending a plurality pieces of first access information by the first terminal device, causing the second terminal device to determine, based on the plurality pieces of first access information as received, the second access information used by the second terminal device to access the second cell, wherein the plurality pieces of first access information correspond to a plurality of first cells one to one, and each piece of first access information among the plurality pieces of first access information is used to access a corresponding first cell.

7. A method for device-to-device (D2D) communication, comprising:
   receiving, by a second terminal device, first access information and condition information sent from a first terminal device, the first access information being used to access a first cell; and
   determining, by the second terminal device based on the first access information when a condition indicated by the condition information is satisfied, second access information used by the second terminal device to access a second cell,
   wherein the condition information comprises a movement speed and a speed threshold of the first terminal device, and
   wherein the determining, by the second terminal device based on the first access information, second access information used by the second terminal device to access a second cell comprises:
  determining, by the second terminal device based on a first TA used to access the first cell, a second TA used to access the second cell if the movement speed of the first terminal device is less than or equal to the speed threshold.

8. The method according to claim 7, wherein the first access information further comprises first system information used to access the first cell, and the second access information further comprises second system information used by the second terminal device to access the second cell.

9. The method according to claim 7, wherein the condition information further comprises at least one piece of following information:
  location condition information, time condition information, and information of a cell ID of the first cell.

10. The method according to claim 9, wherein the location condition information comprises a location of the first terminal device when the first terminal device receives the first TA from other devices and an effective use distance of the first TA.

11. The method according to claim 9, wherein the condition information comprises a cell ID of the first cell,
  the determining, by the second terminal device based on the first access information, second access information used by the second terminal device to access a second cell comprises:
  determining, by the second terminal device based on the first access information, the second access information used to access the second cell if a cell ID of the second cell to be accessed for the second terminal device is the same as the cell ID of the first cell.

12. The method according to claim 9, wherein the receiving condition information by the second terminal device comprises:
  receiving, by the second terminal device, the condition information sent from the first terminal device; or
  receiving, by the second terminal device, the condition information sent from a network device.

13. The method according to claim 7, wherein the receiving, by a second terminal device, first access information sent from a first terminal device comprises:
  receiving, by the second terminal device, the first access information respectively sent from a plurality of first terminal devices;
  the determining, by the second terminal device based on the first access information, second access information used by the second terminal device to access a second cell comprises:
  determining, by the second terminal device, a target terminal device from the plurality of first terminal devices based on speed information or location information of each of the plurality of first terminal devices; and
  determining the second access information by the second terminal device based on the first access information of the target terminal device.

14. The method according to claim 13, wherein before determining, by the second terminal device, a target terminal device from the plurality of first terminal devices based on speed information or location information of each of the plurality of first terminal devices, the method further comprises:
  determining, by the second terminal device, that the second terminal device satisfies a condition indicated by the condition information of each of the plurality of first terminal devices; and
  the determining, by the second terminal device, a target terminal device from the plurality of first terminal devices based on speed information or location information of each of the plurality of first terminal devices comprises:
  determining from the plurality of first terminal devices, by the second terminal device, a first terminal device having a slowest movement speed as the target terminal device, or determining from the plurality of first terminal devices, by the second terminal device, a first terminal device nearest to the second terminal device as the target terminal device.

15. The method according to claim 7, wherein the receiving, by a second terminal device, first access information sent from a first terminal device comprises:
  receiving, by the second terminal device, a plurality pieces of first access information sent from the first terminal device; and
  the determining, by the second terminal device based on the first access information, second access information used by the second terminal device to access a second cell comprises:
  determining, by the second terminal device based on the plurality pieces of first access information, the second access information used by the second terminal device to access the second cell.

16. A terminal device, comprising:
  a processor; and
  a memory for storing instructions executable by the processor;
  wherein the processor is configured to:
  receive first access information and condition information sent from another terminal device, the first access information being used to access a first cell; and
  determine, based on the first access information when a condition indicated by the condition information is satisfied, second access information used by the terminal device to access a second cell,
  wherein the condition information comprises a movement speed and a speed threshold of the first terminal device, and
  the processor is configured to:
  determine, based on a first TA used to access the first cell, a second TA used to access the second cell if the movement speed of the first terminal device is less than or equal to the speed threshold.

* * * * *